United States Patent
Xu et al.

(10) Patent No.: US 10,056,985 B2
(45) Date of Patent: Aug. 21, 2018

(54) BROADBAND COMMUNICATION NETWORK ARCHITECTURE WITH TRAIN CONTROL NETWORK AND TRAIN SERVING NETWORK COMBINED, AND COMMUNICATION METHOD THEREOF

(71) Applicant: CRRC QINGDAO SIFANG ROLLING STOCK RESEARCH INSTITUTE CO., LTD., Qingdao (CN)

(72) Inventors: Yanfen Xu, Qingdao (CN); Shijun Jiang, Qingdao (CN); Shukun Xue, Qingdao (CN)

(73) Assignee: CRRC QINGDAO SIFANG ROLLING STOCK RESEARCH INSTITUTE CO., LTD., Shandong (CN)

(*) Notice: Subject to any disclaimer, the term of this patent is extended or adjusted under 35 U.S.C. 154(b) by 0 days.

(21) Appl. No.: 15/572,774

(22) PCT Filed: Aug. 17, 2016

(86) PCT No.: PCT/CN2016/095646
§ 371 (c)(1),
(2) Date: Nov. 8, 2017

(87) PCT Pub. No.: WO2017/084399
PCT Pub. Date: May 26, 2017

(65) Prior Publication Data
US 2018/0123703 A1    May 3, 2018

(30) Foreign Application Priority Data
Feb. 23, 2016   (CN) .......................... 2016 1 0099714

(51) Int. Cl.
*H04B 10/00* (2013.01)
*H04B 10/85* (2013.01)
(Continued)

(52) U.S. Cl.
CPC .......... *H04B 10/85* (2013.01); *B61L 15/0027* (2013.01); *B61L 15/0036* (2013.01);
(Continued)

(58) Field of Classification Search
CPC ... H04L 12/437; H04L 29/06; H04L 63/0227; H04L 63/0853; H04L 67/12;
(Continued)

(56) References Cited

U.S. PATENT DOCUMENTS 6,473,794 B1 * 10/2002 Guheen ................... H04L 41/22
709/223
6,606,744 B1 *  8/2003 Mikurak ................. H04L 29/06
717/174
(Continued)

FOREIGN PATENT DOCUMENTS

CN    102801597 A    11/2012
CN    103997545 A *   8/2014
(Continued)

OTHER PUBLICATIONS

International Search Report of corresponding International PCT Application No. PCT/CN2016/095646, dated Oct. 31, 2016.
(Continued)

*Primary Examiner* — Amritbir Sandhu
(74) *Attorney, Agent, or Firm* — J.C. Patents

(57) ABSTRACT

A broadband communication network architecture with a train control network and a train serving network combined, is characterized by, comprising a trusted network and an untrusted network; the trusted network comprises a trusted carriage-level network element provided in each carriage,
(Continued)

and in each of a front carriage and a last carriage, in addition to the trusted carriage-level network element, a trusted train-level network element is provided; the untrusted network comprises untrusted train-level network elements respectively provided in the front carriage and the last carriage; one trusted train-level network element communicates with one untrusted train-level network element via a security gateway, and several security gateways are redundant to each other. The network architecture of the present application is a broadband communication network architecture combining a train control network and a train serving network, by which the train control information, the monitored information and the diagnostic information, as well as the passenger information and the video information can be transmitted in a combined network, i.e., the transmission of the data from the passenger information serving system network and the data from the train control network in a combined network, thereby meeting a demand for a bandwidth of the passenger information serving system network and ensuring a stability of the train network.

7 Claims, 4 Drawing Sheets

(51) Int. Cl.
*H04L 12/437* (2006.01)
*H04L 29/06* (2006.01)
*H04Q 11/00* (2006.01)
*B61L 15/00* (2006.01)
*B61L 27/00* (2006.01)
*H04L 29/08* (2006.01)

(52) U.S. Cl.
CPC ....... *B61L 15/0072* (2013.01); *B61L 27/0005* (2013.01); *H04L 12/437* (2013.01); *H04L 29/06* (2013.01); *H04L 63/0227* (2013.01); *H04L 63/0853* (2013.01); *H04Q 11/0066* (2013.01); *B60L 2200/26* (2013.01); *H04L 67/12* (2013.01); *H04Q 2011/0079* (2013.01); *H04Q 2213/13339* (2013.01)

(58) Field of Classification Search
CPC ............ B60L 2200/26; B61L 15/0027; B61L 15/0036; B61L 15/0072; B61L 27/0005; H04B 10/85; H04Q 11/0066; H04Q 2011/0079; H04Q 2213/13339

USPC ........ 105/1.4, 27, 34.2; 246/3, 6, 17, 23, 30, 246/168; 701/19, 117, 251; 398/39, 40; 375/212; 370/245, 258, 405, 406, 460
See application file for complete search history.

(56) References Cited

U.S. PATENT DOCUMENTS

| | | | | |
|---|---|---|---|---|
| 9,166,952 | B2* | 10/2015 | Siu | B61L 15/0027 |
| 10,000,222 | B2* | 6/2018 | Allshouse | B61L 25/025 |
| 2005/0259598 | A1* | 11/2005 | Griffin | B61L 15/00 370/255 |
| 2013/0344802 | A1* | 12/2013 | Armour | H04W 84/005 455/39 |
| 2014/0109214 | A1* | 4/2014 | Siu | B61L 15/0027 726/15 |
| 2018/0084412 | A1* | 3/2018 | Alfred | H04L 63/0442 |

FOREIGN PATENT DOCUMENTS

| | | |
|---|---|---|
| CN | 103997545 A | 8/2014 |
| CN | 104196356 A | 12/2014 |
| CN | 104718726 A | 6/2015 |
| CN | 104796356 A | 7/2015 |
| CN | 204481852 U | 7/2015 |
| CN | 105262651 A | 1/2016 |
| CN | 105791071 A | 7/2016 |
| EP | 1 422 833 A2 | 5/2004 |
| EP | 2 959 654 A1 | 12/2015 |
| RU | 2518180 C2 | 6/2014 |
| RU | 2550537 C2 | 5/2015 |
| WO | WO 2014/060821 A1 | 4/2014 |

OTHER PUBLICATIONS

Chinese First Examination Report of corresponding Chinese patent Application No. 201610099714.1, dated Sep. 6, 2016.
Chinese Second Examination Report of corresponding Chinese patent Application No. 201610099714.1, dated Nov. 28, 2016.
Chinese Third Examination Report of corresponding Chinese patent Application No. 201610099714.1, dated Feb. 14, 2017.
Kusakari, Motoo et al., "On-Board Train Information Control Network Systems" Hitachi Review, Tokyo, Japan; vol. 40, No. 4, Aug. 1, 1991; pp. 303-308.
The Supplementary European Search Report of corresponding European patent Application No. 16 86 5577, dated Feb. 2, 2018.
The Russian International Search Report of corresponding International PCT application No. PCT/CN2016/095646, dated Mar. 5, 2018.

* cited by examiner

BROADBAND COMMUNICATION NETWORK ARCHITECTURE WITH TRAIN CONTROL NETWORK AND TRAIN SERVING NETWORK COMBINED, AND COMMUNICATION METHOD THEREOF

CROSS-REFERENCE TO RELATED APPLICATION

This application is a national phase application of international application No. PCT/CN2016/095646 filed on Aug. 17, 2016, which in turn claims the priority benefits of Chinese application No. 201610099714.1, filed on Feb. 23, 2016. The contents of these prior applications are hereby incorporated by reference in their entirety.

TECHNICAL FIELD

The present application belongs to the technical field of train network communications, and relates to a communication network architecture and in particular to a broadband communication network architecture with a train control network and a train serving network combined and a communication method using this architecture.

BACKGROUND OF THE PRESENT INVENTION

The train communication networks may include a train control network and a train serving network. The train control network mainly functions to control train-borne devices spread in carriages of the train to allow them to operate cooperatively and share information and to realize the failure detection and the maintenance of the train-borne devices. The train serving network mainly functions to provide information service and implement train-ground communication for relevant staff and passengers in the train.

In the prior art, the train communication network has the following problems:

(1) For most trains, the control network and the serving network usually use independent network architectures.

(2) Control buses such as MVB, CAN and HDLC are used in the train control network. With the huge increase in the data volume of communication in the train, it is unable to fulfill the communication of a large amount of data although the communication can be controlled in real time.

(3) In a train supporting the WIFI service, the solution combining the train control network and the train serving network is employed. However, due to the lack of security measures, there is no policy to ensure the network communication security in the train.

(4) In a design where Ethernet is used as a communication network architecture for train vehicles, a twisted-pair cable is used as the Ethernet cable. As a result, the solution is limited by the transmission distance and the transmission quality of the twisted-pair cable.

SUMMARY OF THE PRESENT INVENTION

In view of the deficiencies in the prior art, an object of the present application is to provide a communication network architecture with a train control network and a train serving network combined, which has high data transmission security level, and also provide a train communication method using the network architecture for communication.

The present application employs the following technical solutions. A broadband communication network architecture with a train control network and a train serving network combined, comprising a trusted network and an untrusted network. The trusted network comprises a trusted carriage-level network element provided in each carriage (a train usually comprises a front carriage, a last carriage and middle carriage(s), and the term "each carriage" refers to the front carriage, the last carriage or the middle carriage). In each of the front carriage and the last carriage, in addition to the trusted carriage-level network element, a trusted train-level network element is provided. The untrusted network comprises untrusted train-level network elements respectively provided in the front carriage and the last carriage. One trusted train-level network element communicates with one untrusted train-level network element via a security gateway, and several security gateways are redundant to each other.

For example, in one trusted network, a trusted train-level network element in the front carriage communicates with an untrusted train-level network element in the front carriage via a main security gateway; in the trusted network, a trusted train-level network element in the last carriage communicates with an untrusted train-level network element in the last carriage via an auxiliary security gateway; and the main security gateway and the auxiliary security gateway are redundant to each other. Normally, the trusted train-level network element in the front carriage communicates with the untrusted train-level network element in the front carriage via the main security gateway. When a failure occurs in a communication line of the main security gateway, a communication line of the auxiliary security gateway in the last carriage is activated.

Preferably, in the trusted network, at least one trusted carriage-level network element is provided in each carriage, all trusted carriage-level network elements in each carriage form a trusted carriage-level network element group in each carriage, and two ends of the trusted train-level network element in the front carriage and two ends of the trusted train-level network element in the last carriage are interconnected to form a trusted ring network architecture; the trusted carriage-level network element group in each carriage communicates with the trusted train-level network element in the front carriage and the trusted train-level network element in the last carriage, respectively; in the untrusted network, two ends of the untrusted train-level network element in the front carriage and two ends of the untrusted train-level network element in the last carriage are interconnected to form an untrusted ring network architecture.

Still further, the trusted carriage-level network element group comprises two trusted carriage-level network elements. That is, in each carriage, the trusted carriage-level network element group comprises a trusted carriage-level network element 1 and a trusted carriage-level network element II, the two trusted carriage-level network elements are interconnected. In other words, the trusted carriage-level network element 1 and the trusted carriage-level network element II in each carriage are interconnected; and the trusted carriage-level network element 1 in each carriage is connected to the trusted train-level network element in the front carriage, and the trusted carriage-level network element II in each carriage is connected to the trusted train-level network element in the last carriage.

Specifically, the trusted carriage-level network element group (the interconnected trusted carriage-level network element 1 and trusted carriage-level network element II) in each carriage forms, together with the trusted carriage-level network elements in the front carriage and the trusted carriage-level network elements in the last carriage, the trusted ring network architecture.

Preferably, in the trusted network, at least one trusted carriage-level network element and at least one trusted train-level network element are provided in each carriage, which form a trusted network element group, and the trusted network element groups in the carriages are successively connected in series to form a trusted linear network architecture; in the untrusted network, in addition to the front carriage and the last carriage, the untrusted train-level network element is provided in each carriage (each middle carriage except for the front carriage and the last carriage), the untrusted train-level network elements in the carriages from the front carriage to the last carriage (including the front carriage, the last carriage and the middle carriages) are successively connected to form an untrusted linear network architecture; or, the untrusted train-level network elements in the carriages (including the front carriage, the last carriage and the middle carriages) are successively connected end-to-end to form the untrusted ring network architecture.

Specifically, different from the untrusted linear network architecture, in the untrusted ring network architecture, the untrusted train-level network elements in the front carriage and the last carriage are interconnected to form a ring network.

Still further, in the trusted network, one trusted carriage-level network element and two trusted train-level network elements are provided in each carriage, which are successively connected end-to-end to form a ring network structure in the carriage.

For example, each carriage comprises a trusted carriage-level network element, a trusted carriage-level network element 1 and a trusted carriage-level network element II. The trusted carriage-level network element 1 and the trusted carriage-level network element II are interconnected, and both the trusted carriage-level network element 1 and the trusted carriage-level network element II can communicate with a trusted train-level network element to form a ring network architecture.

Still further, in addition to the front carriage and the last carriage, the trusted train-level network element in any carriage can communicate with the untrusted train-level network element via the security gateway. In this way, a redundancy of the network is enhanced.

Specifically, for each middle carriage, since the untrusted train-level network element is also provided in, the trusted train-level network element in the middle carriage can also communicate with the untrusted train-level network element via a security gateway. This avoids an influence on the network communication in the train when a failure occurs in a communication between the trusted train-level network element and the untrusted train-level network element in the front carriage or the last carriage.

Preferably, optical ports are used as communication ports for the trusted train-level network elements and the untrusted train-level network elements, and an optical cable is used as connection medium between the trusted train-level network element in the front carriage and the trusted train-level network element in the last carriage; and the optical cable is used as connection medium between the untrusted train-level network element in the front carriage and the trusted train-level network element in the last carriage. A Transmission by the optical cable has the advantages of wide transmission frequency band, large communication capacity and low transmission loss. In addition to the optical cable, other communication cable may be used.

A method for performing data communication by using a broadband communication network architecture with a train control network and a train serving network combined, the train control network and the train serving network dividing into the trusted network and the untrusted network, comprises a communication method within the trusted network, and a communication method between the trusted network and the untrusted network.

Data transmitted in the trusted network comprises control data, monitored data and diagnostic information data in the train control network, and further comprises passenger information data and video information data in the train serving network. Different priorities are set for different data. Process data such as the control data, the monitored data and the diagnostic information data have a priority higher than a priority of the passenger information data and the video information data. The data to be transmitted is cached automatically, and then transmitted in priority.

Data to be transmitted between the untrusted network and the trusted network is transmitted bi-directionally between the untrusted train-level network element and the trusted train-level network element via a security gateway. Data transmitted from the trusted network to the untrusted network comprises train travelling data and temperature data inside/outside the train. Data transmitted from the untrusted network to the trusted network comprises ground audio data transferred to an emergency alarm device and ground video data transferred to a top-set box. During a cross-network communication, the security gateway first performs device authentication on a device transmitting the data, and then performs message authentication on the data message if the device fulfills authentication conditions.

The present application has the following beneficial effects.

(1) The network architecture of the present application is a broadband communication network architecture combining a train control network and a train serving network, by which the train control information, the monitored information and the diagnostic information, as well as the passenger information and the video information can be transmitted in a combined network, i.e., the transmission of the data from the passenger information serving system network and the data from the train control network in a combined network, thereby meeting a demand for a bandwidth of the passenger information serving system network and ensuring a stability of the train network.

(2) According to the different security levels of the data to be transmitted in the train control network and the train serving network, the network architecture with a train control network and a train serving network combined is divided into the trusted network and the untrusted network, so that the control data, the monitored data and the diagnostic information data in the train control network and the passenger information data and the video information data in the train serving network are transmitted together in the trusted network, and the train travelling data, the temperature data inside/outside the train, the ground audio data transferred to an emergency alarm device, the ground video data transferred to a set-top box and the like are transmitted between the trusted network and the untrusted network after being authenticated by the security gateway. Meanwhile, the untrusted network is further responsible for a communication between the train and a ground and a WIFI access between the ground and the train. By isolating the wireless network from the physical network in the train, a security of the data transmission in the train network is enhanced.

(3) In the present application, an internally tangent ring network manner is used, which is different from the traditional jumping ring manner. Several trusted carriage-level network elements may be provided in each carriage. The redundant trusted carriage-level network elements are accessed by double network ports, and each trusted carriage-level network element forms a ring network together with the core trusted train-level network element. Even if a failure occurs in the communication in a carriage, the communication in other carriages will not be influenced. Better failure isolation performance and redundancy are exhibited. Specifically, the internally tangent ring network means that all ring centers forming the ring tangency are on a same side of a point of tangency, and that the point of tangency becomes a common node for all rings. By taking network devices in the front carriage and the last carriage as the point of tangency, the network devices serving as the point of tangency form an internally tangent ring network together with network devices in the middle carriages.

BRIEF DESCRIPTION OF THE DRAWINGS

FIG. 5 is a structural schematic view in embodiment 2, in which:

1: untrusted train-level network element;
2: trusted train-level network element;
3: trusted carriage-level network element;
4: security gateway;
5: front carriage; and
6: last carriage.

DETAILED DESCRIPTION OF THE PRESENT INVENTION

Hereinafter, the specific implementations of the present application will be further described in detail with reference to the accompanying drawings.

Embodiment 1

A broadband communication network architecture with a train control network and a train serving network combined (hereinafter referred to as network architecture) is provided, by which a data transmission in a combined network of the train control network and the train serving network can be realized. In the network architecture, the train control network and the train serving network are divided into a trusted network and an untrusted network, wherein data transmitted in the trusted network comprises control data, monitored data and diagnostic information data in the train control network, and further comprises passenger information data and video information data in the train serving network. A data communication is performed between the trusted network and the untrusted network via a security gateway. Data to be transmitted comprises train travelling data and temperature data inside/outside the train, ground audio data transferred to an emergency alarm device, and the ground video data transferred to a set-top box. Meanwhile, the untrusted network is further responsible for a connection between the train and a ground, and a realization of a communication between the train and the ground and a WIFI access between the ground and the train. The WIFI access is highly risky, with a high probability of becoming a way for hacking into the train network.

Figure 1:
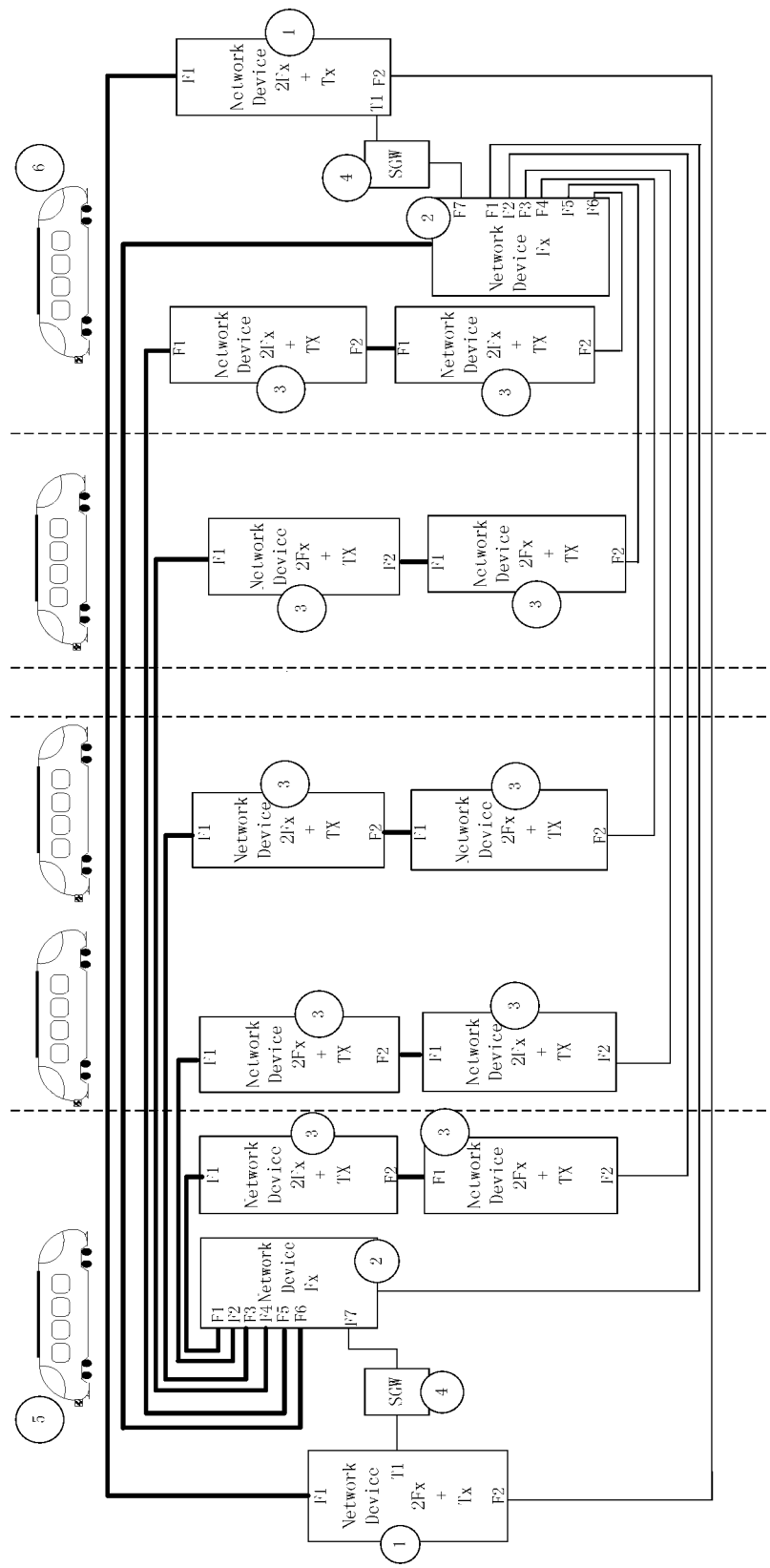
FIG. 1 is a first structural schematic view in embodiment 1.

The network architecture has a following specific structure. As shown in FIG. 1, the trusted network comprises trusted carriage-level network elements 3 in each carriage. In the front carriage 5 and the last carriage 6, in addition to the trusted carriage-level network elements 3, trusted train-level network elements 2 are provided. The untrusted network comprises untrusted train-level network elements 1 respectively provided in the front carriage 5 and the last carriage 6. In the trusted network, the trusted train-level network element 2 in the front carriage 5 communicates with the untrusted train-level network element 1 in the front carriage 5 via a security gateway 4; and in the trusted network, the trusted train-level network element 2 in the last carriage 6 communicates with the untrusted train-level network element 1 in the last carriage 6 via a security gateway 4. The two security gateways 4 may be a main security gateway and an auxiliary security gateway, which are redundant to each other. For example, if the security gateway 4, to which the front carriage 5 is connected, is defined as the main security gateway, normally, the trusted train-level network element 2 in the front carriage 5 communicates with the untrusted train-level network element via the main security gateway. When a failure occurs in a communication line of the main security gateway or a failure occurs in devices, a communication line between the last carriage 6 and the auxiliary security gateway is activated.

Figure 2:
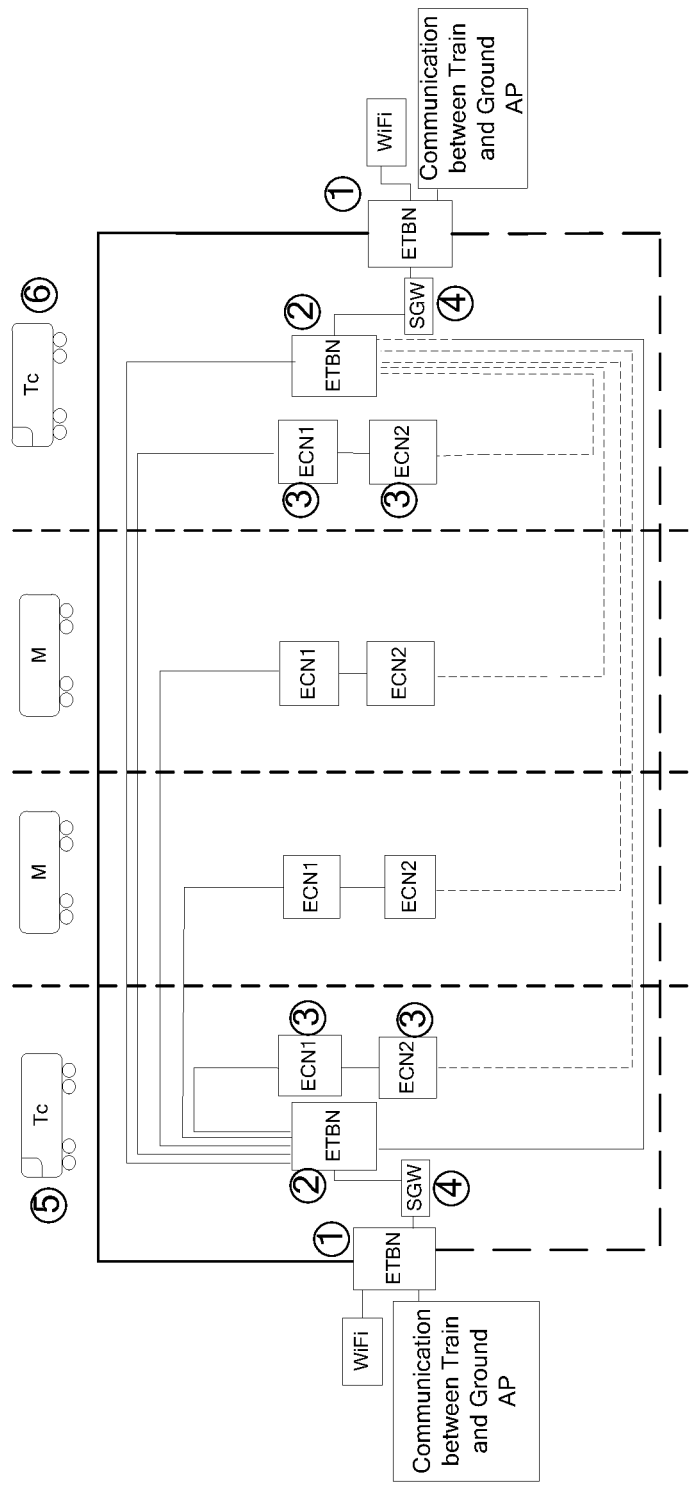
FIG. 2 is a second structural schematic view in embodiment 1.

As shown in FIG. 2, a specific implementation of the network architecture will be described by taking a train having two motor carriages and two trailer carriages as an example. Such four carriages are arranged in a following form: motor carriage (TC)—trailer carriage (M)—trailer carriage (M)—motor carriage (TC). Among the four carriages, the two motor carriages are a front carriage and a last carriage, and the two trailer carriages are middle carriages. Since network elements in the front carriage and the last carriage are responsible for a communication between the trusted network and the untrusted network, arrangements of the network elements in the front carriage and the last carriage are different from arrangements of the network elements in the middle carriages.

The network elements are arranged in a following way. In the middle carriages (the two trailer carriages in this embodiment), a covered network is the trusted network, and two trusted carriage-level network elements, i.e., a trusted carriage-level network element I3 and a trusted carriage-level network element II3, are provided in each carriage, which form a trusted carriage-level network element group. It is to be noted that a use of a redundant design of the two trusted carriage-level network elements facilitates an establishment of a redundant network architecture and ensures a stability of the network communication. According to requirements of the network architecture, the number of the trusted carriage-level network elements in each carriage is not limited to two. There may be one, three or more than three trusted carriage-level network elements in each carriage. The front carriage and the last carriage become an intersection of the trusted network and the untrusted network, covered with both the trusted network and the untrusted network. Inside each of the front carriage and the last carriage, in addition to the two trusted carriage-level network elements 3 (the trusted carriage-level network element I3 and the trusted carriage-level network element II3, which form the trusted carriage-level network element group), one trusted train-level network element 2 and one untrusted train-level network element 1 are provided. Meanwhile, a security gateway 4 is further provided as a tool for performing network communication authentication.

The network has a following structure. In each of the two trailer carriages, the front carriage and the last carriage, the trusted carriage-level network element I3 and the trusted carriage-level network element II3 are connected in series, and the trusted carriage-level network element I3 and the trusted carriage-level network element II3 are redundant to each other to ensure a device-level redundancy. The trusted carriage-level network element I3 and the trusted carriage-level network element II3 are connected by a hundred-megabyte Ethernet twisted-pair. The trusted carriage-level network element I3 in each carriage is connected to the trusted train-level network element 2 in the front carriage, and the trusted carriage-level network element II3 in each carriage is connected to the trusted train-level network element 2 in the last carriage. As shown in FIG. 2, a network connection indicated by solid lines and a network connection indicated by dashed lines form trusted ring network architectures which are redundant to each other, one of which is a main line and an other of which is a backup line. Normally, the main line operates, and when a failure occurs in the main line, the backup line is activated to operate. In addition to connection ports for the trusted carriage-level network elements 3 in each carriage, the trusted train-level network element 2 in the front carriage and the trusted train-level network element 2 in the last carriage have two interconnected ports respectively, by which the two ends of the trusted train-level network element 2 in the front carriage and the trusted train-level network element 2 in the last carriage are interconnected to form the trusted ring network architecture. The trusted train-level network element 2 in the front carriage is connected to the untrusted train-level network element 1 in the front carriage via the security gateway 4. Similarly, the trusted train-level network element 2 in the last carriage is connected to the untrusted train-level network element 1 in the last carriage via the security gateway 4. In this way, the communication between the trusted network and the untrusted network is realized. In the untrusted network, the untrusted train-level network element 1 in the front carriage and the untrusted train-level network element 1 in the last carriage also have two interconnected ports respectively, by which the two ends of the untrusted train-level network element 1 in the front carriage and the untrusted train-level network element 1 in the last carriage are interconnected to form the untrusted ring network architecture. Optical ports are used as the ports for the trusted train-level network elements and the untrusted train-level network elements for communication. In a connection network between the train-level network elements, 1000Base-LX is used as a train bus which supports a full-duplex mode and has a transmission rate of 1000 Mbit/s. Optical cables are used as connection media between the trusted train-level network element in the front carriage and the untrusted train-level network element in the last carriage; and optical cables are also used as connection media between the untrusted train-level network element in the front carriage and the trusted train-level network element in the last carriage.

A method for connection and communication with train-borne devices will be described as below.

Figure 3:
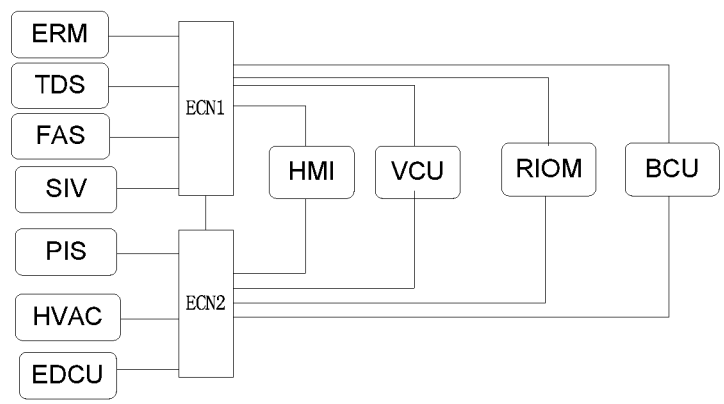
FIG. 3 is a structural schematic view showing a connection between trusted carriage-level network elements in a motor carriage, according to embodiment 1.

In the trusted network, the trusted carriage-level network elements 3 have functions such as routing and network address conversion, and are responsible for a reconfiguration of the network after a reconnection and a de-multiplexing of the train. The devices in the trusted network are within a same local area network, mainly for transmitting the train control information, the monitored information and the diagnostic information, as well as the passenger information and the video information. Different priorities are set for different data. Process data such as the train control data, the monitored data and the diagnostic information data have a highest priority, and the video information has a lower priority. The data to be transmitted is cached automatically, and then transmitted in priority. In the motor carriages, the trusted carriage-level network elements 3 are two-layer switches with a 24 hundred megabytes electric port+a 2 kilomega optical port, the switches are connected to each other by an optical port. As shown in FIG. 3, key terminal devices, such as a human-machine interface HMI in a cab, a vehicle control unit VCU, a remote input/output module RIOM and a brake control unit BCU, are connected to two redundant carriage-level switches meanwhile by two network ports. Single network port device, such as a fire alarm system FAS, an event record module ERM, a traveling diagnostic system TDS, an auxiliary control unit SIV, an electronic door control unit EDCU, a heating, ventilation and air conditioning unit HVAC, and a projection host, an end screen, a camera, an emergency alarm device, a LCD map, a passenger information system controller and a carriage controller in the PIS system are to be connected to one of the two switches as desired.

Figure 4:
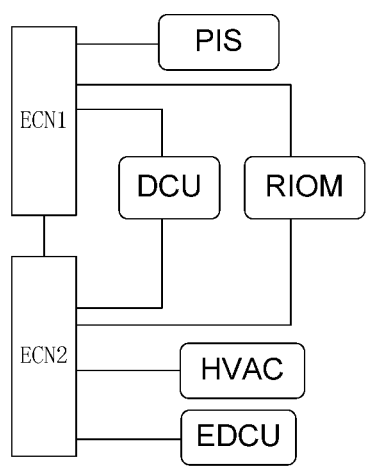
FIG. 4 is a structural schematic view showing a connection between trusted carriage-level network elements in a trailer carriage, according to embodiment 1.

In the trailer carriages, the trusted carriage-level network elements 3 are two-layer switches with a 24 hundred megabytes electric port+a 2 kilomega optical port, the switches are connected to each other by an optical port. As shown in FIG. 4, a drive control unit DCU and the remote input/output module RIOM are connected to the redundant switches by two network ports. The carriage controller, the LCD electronic map, the emergency alarm device, the carriage controller and a carriage network switching unit in the PIS system are to be connected to one of the two switches as desired, respectively.

In the untrusted network, the devices in the PIS system, such as a central server and a WIFI access device, which are related to the communication between the train and the ground and to a WIFI serving network, are arranged in the untrusted network. In the untrusted network, a train-level bandwidth is 1000M, in full-duplex mode. Carriage-level devices adopt a hundred-megabyte full-duplex mode. In each motor carriage and each trailer carriage, WIFI hotspots are arranged; and the central server is arranged in a motor carriage.

The untrusted network and the trusted network are connected by security gateways via a hundred-megabyte port. There are two types of messages passing the security gateways:

data streams transmitted from the untrusted network to the trusted network: the ground audio data transferred to the emergency alarm device, and the ground video data transferred to the set-top box; and data streams transmitted from the trusted network to the untrusted network: the train travelling data and the temperature data inside/outside the train.

The security gateway has functions of device authentication and message authentication. Terminal devices which need to perform cross-network communication should first pass the device authentication of the security gateway. The messages passing the security gateway have to be in the predefined format. That is, messages in the predefined format can be transmitted between the trusted network and the untrusted network via the security gateway.

Embodiment 2

This embodiment provides a broadband communication network architecture with a train control network and a train serving network combined. Similarly to the embodiment 1, the network architecture is still divided into a trusted network and an untrusted network. A difference from the embodiment 1 lies in a specific structure of the network architecture.

Figure 5:
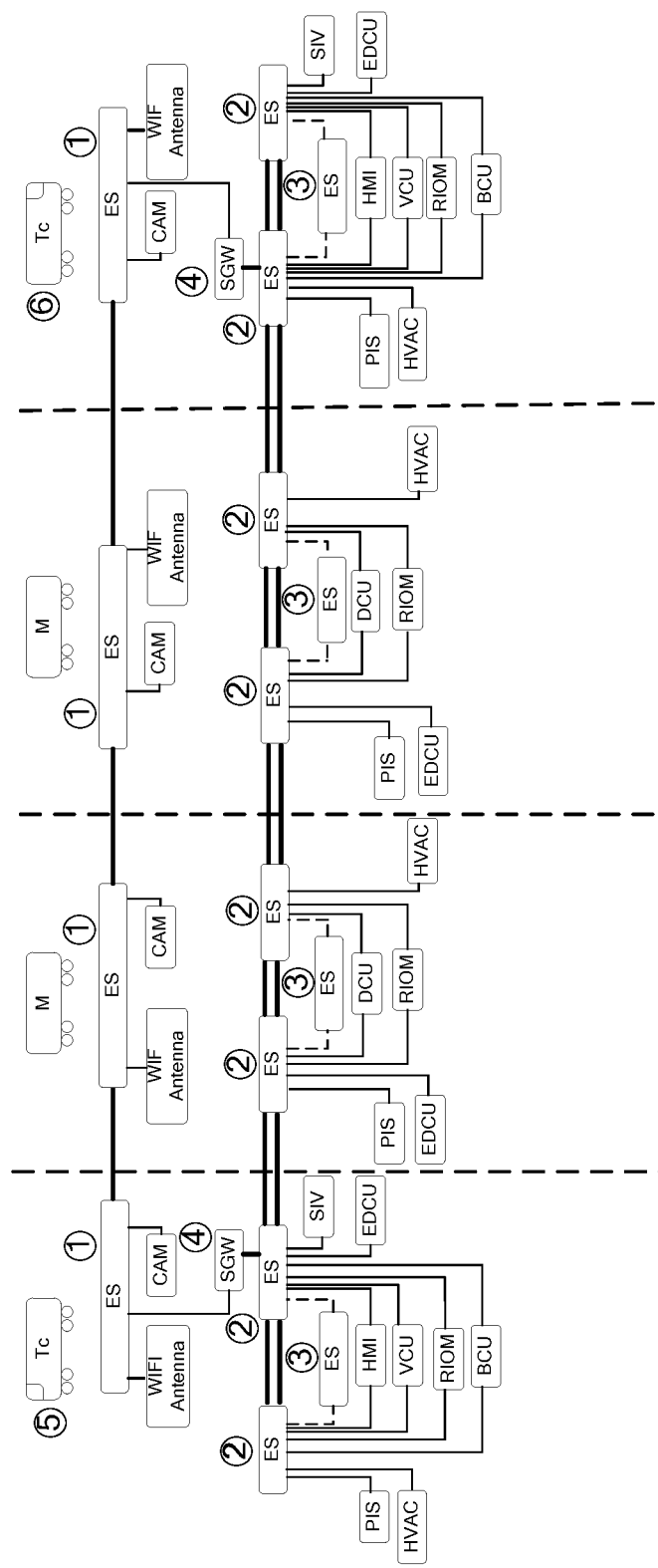

As shown in FIG. 5, a specific implementation of the network architecture will also be described by taking a train having two motor carriages and two trailer carriages as an example. Such four carriages are arranged in a following form: motor carriage (TC)—trailer carriage (M)—trailer carriage—motor carriage (TC). Among those carriages, the two motor carriages are a front carriage and a last carriage, and the two trailer carriages are middle carriages. Network elements in the front carriage and the last carriage are responsible for a communication between the trusted network and the untrusted network.

In this embodiment, in the trusted network, the network is designed to have two architectures, i.e., train-level and carriage-level. That is, the trusted network comprises a trusted train-level network and a trusted carriage-level network.

The number of trusted carriage-level network elements in each carriage can be determined by the number of terminal devices. In this embodiment, one trusted carriage-level network element 3 and two trusted train-level network elements 2 are provided in each carriage, which three network elements are successively connected end-to-end to form a redundant ring network structure. In other words, in the carriage-level network, the trusted carriage-level network element and the trusted train-level network elements in this carriage form a ring network. The two trusted train-level network elements 2 are redundant to each other.

The communication in a carriage is realized by the trusted carriage-level network element 3 or the trusted train-level network elements 2. Any two trusted train-level network elements 2 in each carriage are successively connected in series to the trusted train-level network elements 2 in an adjacent carriage, respectively, to form a trusted linear network architecture.

In the train-level network, by means of link aggregation, the trusted train-level network elements 2 supporting a bypass function form the linear network. In the untrusted network, an untrusted train-level network element 1 is provided in each of the front carriage, the last carriage and the middle carriages. The untrusted train-level network elements 1 are successively connected from the front carriage to the last carriage to form an untrusted linear network architecture. The untrusted train-level network elements 1 in the front carriage and the last carriage are connected to and communicate with the trusted train-level network elements 2 in the front carriage and the last carriage via security gateways 4. Similarly to a principle of the embodiment 1, the security gateways in the front carriage and the last carriage comprise a main security gateway and an auxiliary security gateway. Normally, the main security gateway is responsible for the communication between the trusted network and the untrusted network. When a failure occurs in a communication line of the main security gateway or a failure occurs in devices, a communication line of the auxiliary security gateway is responsible for the communication. It is also to be noted that, in this solution, the security gateways which are redundant to each other are placed in the front carriage and the last carriage. However, during the practical application, a position of the security gateway may be determined as desired, not limited to a certain specific carriage. If the security gateway is arranged in a middle carriage, the trusted carriage-level network element 2 in the middle carriage is connected to the security gateway to form a communicative connection between the trusted network and the untrusted network. That is, the trusted carriage-level network element 2 in the middle carriage communicates with the untrusted train-level network element 2 in the same middle carriage via the security gateway.

In the untrusted network, the network may be a ring network, a linear network or a star network according to the actual need. In this embodiment, a linear network in which one train-level network element in each carriage is linearly connected is used.

Communication interfaces between the network elements can be configured as desired, and transmission media between the trusted network and the untrusted network are not limited to optical fibers and cables.

In the trusted network, the train-level network uses two-layer switch with a 24 hundred megabytes electric port. The key terminal devices, such as a human-machine interface HMI in a cab, a vehicle control unit VCU, a remote input/output module RIOM and a brake control unit BCU, are connected to two redundant train-level switches meanwhile by two network ports. Single network port device, such as an auxiliary control unit SIV, an electronic door control unit EDCU, a heating, ventilation and air conditioning unit HVAC, and a projection host, an end screen, a camera, an emergency alarm device, a LCD map, a passenger information system controller and a carriage controller in the PIS system are to be connected to one of the two redundant train-level switches as desired.

A method for data communication between the trusted networks and between the trusted network and the untrusted network is similar to the embodiment 1.

What is claimed is:

1. A broadband communication network on-board a train shared by a train control network and a train serving network, the broadband communication network, used for co-network data transmission of the train control network and the train serving network, comprising a trusted network and an untrusted network; wherein:

the trusted network comprises a plurality of trusted carriage-level network elements and a plurality of trusted train-level network elements, each middle carriage of the train and each of a front carriage and a last carriage of the train are provided with at least one trusted carriage-level network element, one trusted train-level network element is provided in each of the front carriage and the last carriage, respectively, the trusted carriage-level network element communicates with the trusted train-level network element; data transmitted in the trusted network comprises control data, monitored data and diagnostic information data in the train control network, and passenger information data and video information data in the train serving network;

the untrusted network comprises untrusted train-level network elements respectively provided in the front carriage and the last carriage; the trusted train-level network element in the front carriage communicates with the untrusted train-level network element in the front carriage via a first security gateway provided in the front carriage, the trusted train-level network element in the last carriage communicates with the untrusted train-level network element in the last carriage via a second security gateway provided in the last carriage, and the first and the second security gateways are redundant to each other; the untrusted network is responsible for a connection between the train and a ground;

data to be transmitted between the trusted network and the untrusted network is communicated bi-directionally between the trusted train-level network elements and the untrusted train-level network elements via the first or the second security gateway.

2. The broadband communication network according to claim 1, wherein, in the trusted network, for the each middle carriage, two trusted carriage-level network elements, a first trusted carriage-level network element and a second trusted carriage-level network element, are provided, the two trusted carriage-level network elements are interconnected to form a trusted carriage-level network element group, and the trusted train-level network element in the front carriage and the trusted train-level network element in the last carriage have two interconnected ports respectively, and two ends interconnection between the trusted train-level network element in the front carriage and the trusted train-level network element in the last carriage is realized by the interconnected ports, and the first trusted carriage-level network element in the each middle carriage is connected to the trusted train-level network element in the front carriage, and the second trusted carriage-level network element in the each middle carriage is connected to the trusted train-level network element in the last carriage to form a trusted ring network architecture; in the untrusted network, the untrusted train-level network element in the front carriage and the untrusted train-level network element in the last carriage have two interconnected ports respectively, and two ends interconnection between the untrusted train-level network element in the front carriage and the untrusted train-level network element in the last carriage is realized by the interconnected ports to form an untrusted ring network architecture.

3. The broadband communication network according to claim 1, wherein, in the trusted network, at least one trusted train-level network element are provided in the each middle carriage and each of the front carriage and the last carriage, and the trusted train-level network elements in carriages from the front carriage to the last carriage are successively Connected to form a trusted train-level linear network architecture; in the untrusted network, in addition to the front carriage and the last carriage, the untrusted train-level network element is provided in tag each middle carriage; the untrusted train-level network elements in carriages from the front carriage to the last carriage are successively connected to form an untrusted linear network architecture; or, the untrusted train-level network elements in the carriages are successively connected end-to-end to form the untrusted ring network architecture.

4. The broadband communication network according to claim 1, wherein optical ports are used as communication ports for the trusted train-level network elements and the untrusted train-level network elements, and an optical cable is used as connection medium between the trusted train-level network element in the front carriage and the trusted train-level network element in the last carriage; and the optical cable is used as connection medium between the untrusted train-level network element in the front carriage and the untrusted train-level network element in the last carriage.

5. The broadband communication network according to claim 2, wherein optical ports are used as communication ports for the trusted train-level network elements and the untrusted train-level network elements, and an optical cable is used as connection medium between the trusted train-level network element in the front carriage and the trusted train-level network element in the last carriage; and the optical cable is used as connection medium between the untrusted train-level network element in the front carriage and the untrusted train-level network element in the last carriage.

6. The broadband communication network according to claim 3, wherein, in addition to the front carriage and the last carriage, in the each middle, carriage, the trusted train-level network element can communicate with the untrusted train-level network element via a security gateway provided in the each middle carriage.

7. The broadband communication network according to claim 3, wherein optical ports are used as communication ports for the trusted train-level network elements and the untrusted train-level network elements, and an optical cable is used as connection medium between the trusted train-level network element in the front carriage and the trusted train-level network element in the last carriage; and the optical cable is used as connection medium between the untrusted train-level network element in the front carriage and the untrusted train-level network element in the last carriage.

* * * * *